United States Patent
Dean et al.

[11] Patent Number: 5,914,957
[45] Date of Patent: Jun. 22, 1999

[54] AUTOMATIC NODE CONFIGURATION WITH IDENTICAL NODES

[75] Inventors: Alexander G. Dean, Pittsburgh, Pa.; Bhargavender P. Upender, Middletown; David C. Brajczewski, Vernon, both of Conn.

[73] Assignee: Otis Elevator Company, Farmington, Conn.

[21] Appl. No.: 08/772,036

[22] Filed: Dec. 19, 1996

[51] Int. Cl.[6] .................................................. H04L 12/40
[52] U.S. Cl. .......................... 370/438; 370/362; 370/364
[58] Field of Search .................................... 370/362, 364, 370/365, 438, 439, 432, 475, 460, 451, 452, 254; 340/825.05, 825.06, 825.16, 825.17

[56] References Cited

U.S. PATENT DOCUMENTS

| | | | |
|---|---|---|---|
| 5,039,980 | 8/1991 | Aggers et al. | 340/506 |
| 5,453,737 | 9/1995 | Opoczynski | 340/825.03 |

*Primary Examiner*—Michael Horabik
*Assistant Examiner*—Binyam Tadesse

[57] ABSTRACT

A node configuration system with identical nodes includes a master 10 connected to a plurality of identical servant nodes 12–18 through a shared communication link (or bus) 20 and an unshared communication link (daisy-chain) (28,34,38,44, 48). The master 16 assigns a unique identifier to each of the servant nodes 12–18, sequentially and individually, in a clockwise (CW) direction by sending configuration messages on the shared bus and configuration enable signals on the unshared link. The process begins with the master setting its configuration enable signal (CW-Cout port 24) to one and broadcasting a configuration message on the bus 20, which configures the servant node 12. As each servant node is configured, it sets its CW-Cout port to one which enables the next node in the chain to be configured. This process continues until all the servants 12–18 have been configured. In the event of a fault, the master 10 attempts to configure the remaining servant nodes in the counter-clockwise (CCW) direction.

18 Claims, 6 Drawing Sheets

AUTOMATIC NODE CONFIGURATION WITH IDENTICAL NODES

CROSS REFERENCES TO RELATED APPLICATIONS

Copending U.S. patent application, Ser. No. 08/769,821, entitled "Multi-topology Network Communication Link Interface", filed contemporaneously herewith, contains subject matter related to that disclosed herein.

TECHNICAL FIELD

This invention relates to automatic node configuration and more particularly to automatic node configuration using identical nodes.

BACKGROUND ART

It is known in the art of digital communications that a communication network is used to transfer information from one device to another. Each device on the network is called a "node" and the network has at least one master node and one or more servant or slave nodes. Some networks may require each servant node to identify itself in order to transmit any information to the other nodes or may require the servant to have a unique identifier for it to receive messages from another node. Providing a unique identifier to each servant node can be time-consuming and costly in large networks, requiring customization of each servant node to provide a unique identifier for each servant node.

The process of identifying each servant node on a network is called network (or servant or node) configuration. Network configuration is currently performed for each servant node using non-volatile memory, e.g., EPROM, EEPROM, Flash ROM, battery-backed memory, or by hardwired approaches, such as jumpers, DIP switches, etc. In the jumper approach, the servant node address is set manually by cutting the appropriate wires, cutting printed circuit board traces, or by installing conductive jumpers across header pins. In the DIP switch approach, the address is assigned by setting the appropriate switches to the desired states. In the non-volatile memory approaches, each servant node is programmed using special memory programming hardware. The assignment of the servant node identifier (or address) may be performed upon installation of the node in its desired application at its desired location, or alternatively, may be done at the factory in what is referred to as the "serial number" approach. In the serial number approach, a unique identifier is assigned to each servant node at the factory, where the servant node address is based on the serial number of the servant node.

Each of these configuration techniques requires additional hardware and/or is labor intensive.

DISCLOSURE OF INVENTION

Objects of the invention include provision of a master-servant network with reduced configuration hardware and simplified installation procedure for identifying servant nodes in a communication network.

According to the present invention a communication network includes a plurality of servant nodes each receiving configuration enable signals, each receiving configuration messages, each being configured with a unique identifier corresponding to each of the servant nodes in response to a corresponding one of the configuration enable signals and a corresponding one of the configuration messages, and each providing a configuration enable signal when a corresponding one of the servant nodes is configured; a master node which provides the configuration messages to all of the servant nodes, each of the messages being indicative of the unique identifier for a corresponding one of the servant nodes being configured, and which provides the configuration enable signal to a first one of the servant nodes when the first servant node is being configured; the master node and all of the servant nodes being connected to each other by a communication link which passes shared data between the master node and all of the servant nodes and passes unshared data between predetermined groups of the master and servant nodes; the configuration messages being provided on the communication link as the shared data and the configuration enable signals being provided on the communication link as the unshared data; and each of the servant nodes being configured with the unique identifier based on a corresponding one of the configuration messages from the master node when the corresponding configuration message is received and when a corresponding one of the enable signals is received.

According further to the present invention the communication link comprises separate shared and unshared communication links, the shared link propagating the shared data and the unshared link propagating the unshared data.

According still further to the present invention, the communication link comprises a common shared/unshared communication link which propates both the shared data and the unshared data.

The invention represents a significant improvement over the prior art by allowing all the servant nodes to be identical. The invention provides for automatic network (or servant) configuration without requiring manual setting of the servant node addresses, is easy to reconfigure, does not require expensive hardware, and provides fault detection and recovery. In particular, for a single point failure between two nodes, the system allows for complete configuration of all nodes notwithstanding such failure. Moreover, the invention uses shared and unshared communications busses which require minimal or no additional wiring, thereby allowing for easy installation and minimal cost to retrofit existing systems and minimal additional cost for new systems. In one embodiment, only one additional pair of wires is required to be installed between the master and the servants, and in another embodiment no additional wires are required. Since the servant nodes tend to be high volume components, the invention provides a low-cost design which may be implemented easily in hardware and does not require expensive components such as a microprocessor or nonvolatile memory.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
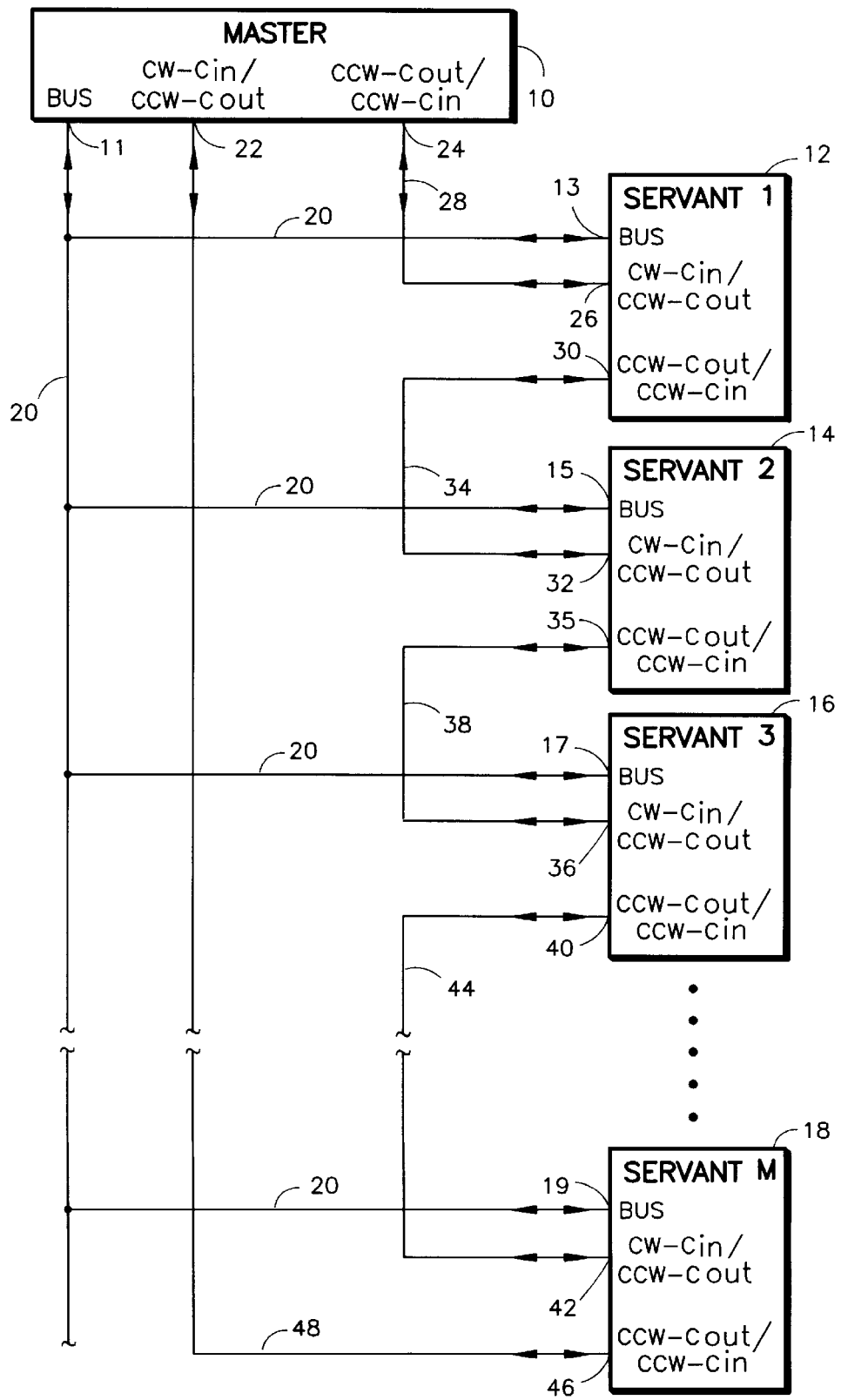
FIG. 1 is a schematic block diagram of a communication network having a master node and M servant nodes, in accordance with the present invention.

Referring to FIG. 1, an automatic network configuration system with identical nodes comprises a master node 10 and one or more servant nodes 12,14,16,18 (hereinafter referred to as servant nodes 12–18). A bi-directional shared communication Bus (or link) 20 is connected from a port 11 of the master node 10 to ports 13,15,17,19 of the servant nodes 12,14,16,18, respectively. The bus 20 enables the master node 10 and the servant nodes 12–18 to communicate with each other using a known communication protocol. The details of the communication protocol for the bus 20 are not critical to the present invention, and may be any master servant or servant-servant protocol known in the art, such as those described in copending U.S. patent application Ser. No. (UTC Docket No. OT-2624), entitled "Message Routing in Control Area Network (CAN) Protocol", or the Control Area Network (CAN) Standards ISO 11898 or ISO 11519-1 or equivalent.

The system also has an unshared bi-directional communication link comprising daisy-chain (or point-to-point or series or ring) connections from the master 10 to the first and last servant nodes 12,18, respectively, and between adjacent servant nodes. This unshared communication link carries configuration enable signals between the master 10 and the servants 12,18 adjacent thereto and between the servants 12–18.

In particular, the master 10 has an input/output (I/O) port 22 (CW-Cin/CCW-Cout) and an I/O port 24(CW-Cout/CCW-Cin). The ports 22,24 are part of the aforementioned unshared daisy-chain connection between nodes. Also, the I/O port 24 of the master 10 is connected to an I/O port 26 (CW-Cin/CCW-Cout) of the servant node 12 by a line 28. Similarly, an I/O port 30 (CW-Cout/CCW-Cin) of servant node 12 is connected to an I/O port 32 (CW-Cin/CCW-Cout) of the servant node 14 by a line 34. Similarly, an I/O port 35 (CW-Cout/CCW-Cin)of the servant node 14 is connected to an I/O port 36 (CW-Cin/CCW-Cout) of the servant node 16 by a line 38. Similarly, an I/O port 40 (CW-Cout/CCW-Cin) of servant node 16 is connected to an I/O port 42 (CW-Cin/CCW-Cout) of the last servant node 18 (node M) by a line 44. Also, an I/O port 46 (CW-Cout/CCW-Cin) of the servant node 18 is connected to the I/O port 22 (CW-Cin/CCW-Cout) of the master 10 by a line 48. The shared link 20 and the unshared link 28,34,38,44,48 may be collectively referred to herein as a communication link.

Each of the servant nodes 12–18 has identical hardware and software/firmware for the functions relating to servant node configuration, and does not require pre-wired or pre-stored unique node identifiers (or node addresses) associated therewith for node configuration to occur. If desired, the master 10 may also have the same hardware design as the servants. The master node 10 and the identical servant nodes 12–18 work together to determine a unique identifier for each of the servant nodes 12–18, as discussed hereinafter. Also, the master 10 may configure the servant nodes 12–18 in either a clockwise direction (i.e., starting with node 12 and proceeding sequentially to node 18), or counterclockwise direction (sequentially from node 18 through node 12).

Such bi-directional configuration is provided to allow the system to initialize as many nodes as possible in the event of a failure, as discussed hereinafter.

Figure 2:
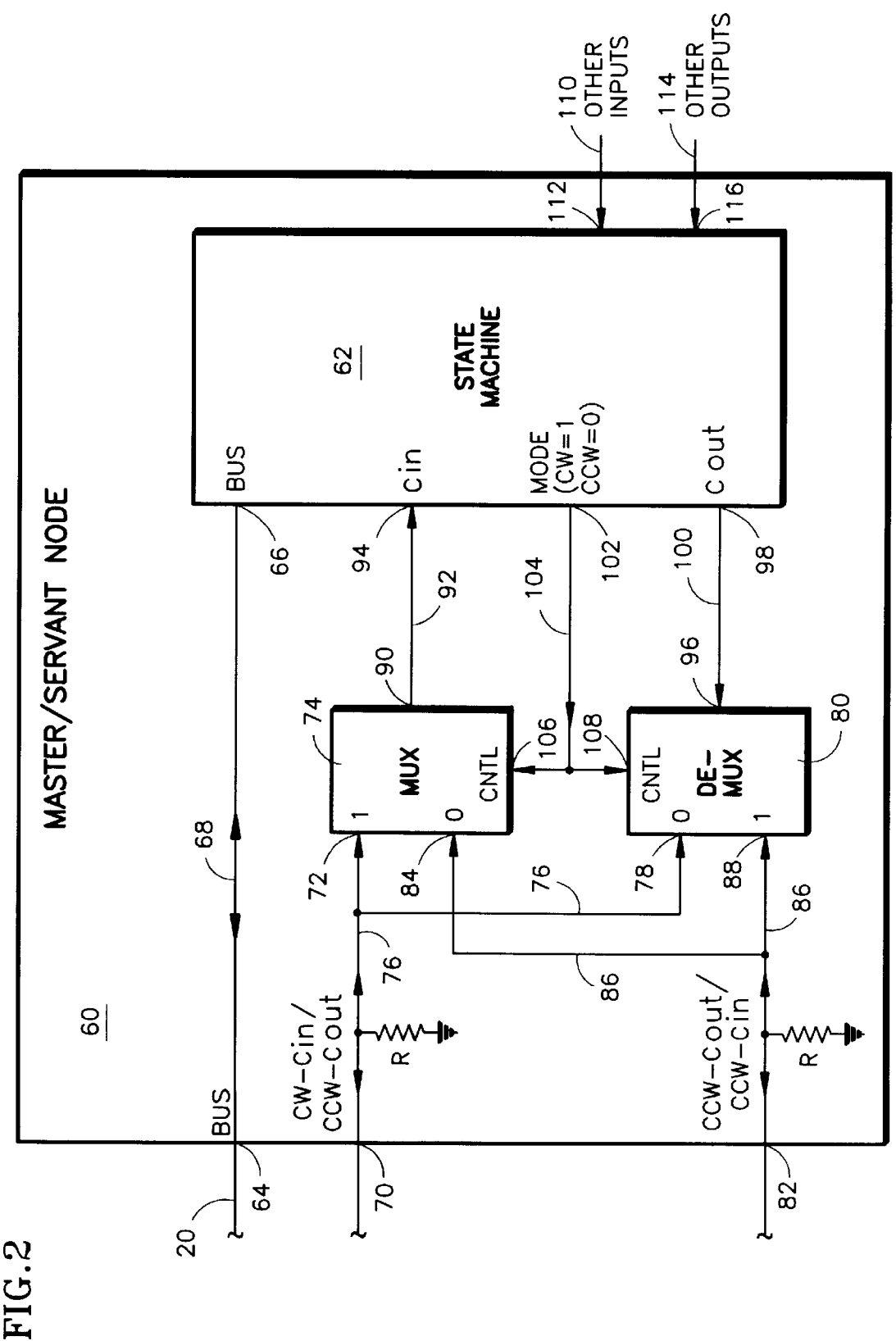
FIG. 2 is a schematic block diagram of a master/servant node for the system of FIG. 1, in accordance with the present invention.

Referring to FIG. 2, a hardware design for a generic master/servant node 60 comprises a known state machine 62. The state machine 62 may comprise a known microprocessor, signal processor, or a state machine device which has the capability and memory (as needed) to execute a predetermined series of operations to perform the functions described herein (hereinafter referred to as a state machine).

An input/output (I/O) port 64 is connected to a port 66 of the state machine 62 by a line 68 for connecting the aforementioned data bus 20 to the state machine 62. The port 64 is equivalent to the port 13 of the servant node 12 of FIG. 1 and equivalent to the port 11 of the master 10 of FIG. 1. An input/output port 70 (CW-Cin/CCW-Cout) is connected to a "1" input port 72 of a 2-to-1 multiplexer (mux) 74 by a line 76. The line 76 is also connected to a "0" output port 78 of a 1-to-2 demultiplexer (de-mux) 80. Further, the line 76 is connected through a resistor R to ground potential. The resistor R pulls the line 76 and the port 70 to ground potential in the event that the port is being used as an input port and becomes disconnected or is otherwise placed in a high impedance state. Also, the non-selected output of the de-mux 80 is in a high impedance state.

The master/servant circuit 60 has another I/O port 82 (CW-Cout/CCW-Cin) which is connected to a "0" input port 84 of the mux 74 by a line 86. The port 82 is also connected to a "1" output port 88 of the de-mux 80 by the line 86.

An output port 90 of the mux 74 is connected to an input port 94 of the state machine 62 by a line 92 which carries a configuration enable input signal Cin to the state machine 62. Also, an input port 96 of the de-mux is connected to an output port 98 of the state machine 62 by a line 100, which carries a configuration enable output signal Cout from the state machine 62. A mode output signal from a port 102 of the state machine 62 is provided on a line 104 to address (or control) input ports 106,108 of the mux 74 and the de-mux 80, respectively.

The state machine 62 also may be responsive to other inputs along lines 110 at input ports 112 and may provide other output signals on lines 114 from output ports 116. The type of such other input and output signals will depend on the application in which the master/servant network operates. Also, the node may have additional input or output interface hardware (not shown) as needed for such other inputs or outputs. For example, in an elevator application, the servant nodes 12–18 may be located on different floors of a building and may provide information regarding, or control of, one or more of the following: elevator call buttons, elevator lantern control, crowd sensors (how many passengers are waiting for a cab), the temperature, fire mode, or other information. The invention is not limited to use in elevator applications, but may be used in any application which has a master-servant network.

The mux 74 and the de-mux 80 allow the I/O ports 70,82 to operate in a bi-directional fashion to allow for configuration in either the clockwise (CW) or the counterclockwise (CCW) direction. In particular, if the state machine 62 indicates that the mode is CW, the mode signal on the line 104 will be 1, the mux 74 will select channel 1, and the Cin signal will be coupled from the I/O port 70, through the mux 74, to the input port 94 of the state machine 62. Also, when the mode is CW (mode=1), the de-mux 80 will select channel 1 and couple the signal Cout from the port 98 of the state machine 62, through the de-mux 80, to the I/O port 82.

In that case, the port 70 is configured as an input port, and the port 82 as an output port, thereby allowing CW configuration of the servant nodes 12–18, discussed more hereinafter.

Conversely, if the state machine 62 sets the mode to CCW, the mode signal on the line 104 is zero and the mux 74 and the de-mux 80 will select their 0 channel, thereby connecting the Cin signal from the port 82 to the input port 94 of the state machine 62 and connecting the Cout signal from the output port 98 of the state machine 62 to the I/O port 70. In that case, the port 82 is configured as an input port and the port 70 is configured as an output port, thereby allowing for CCW configuration of the servant nodes 12–18.

Referring to FIG. 1, in general, the master node 10 assigns unique node identifiers (or node addresses) to each of the servant nodes, which is referred to as network or servant configuration. The master configures the servant nodes 12–18, one at a time, sequentially and individually, in a clockwise (CW) or top-down direction by sending configuration messages on the shared bus 20 and configuration enable signals on the unshared link. The process begins with the master setting its CW-Cout in port to one and broadcasting a configuration message on the bus 20. As each servant node is configured, the servant sets its CW-Cout port to one which enables the next node in the chain to be configured. This process continues until all servant nodes 12–18 have been configured. Also, in the event of a fault, power-up or reset condition of a servant node or the master, the master 10 attempts to configure the remaining servant nodes in counterclockwise (CCW) direction or bottom-up. This allows the system to configure the maximum number of servant nodes when a fault exists, as discussed hereinafter.

Figure 3:
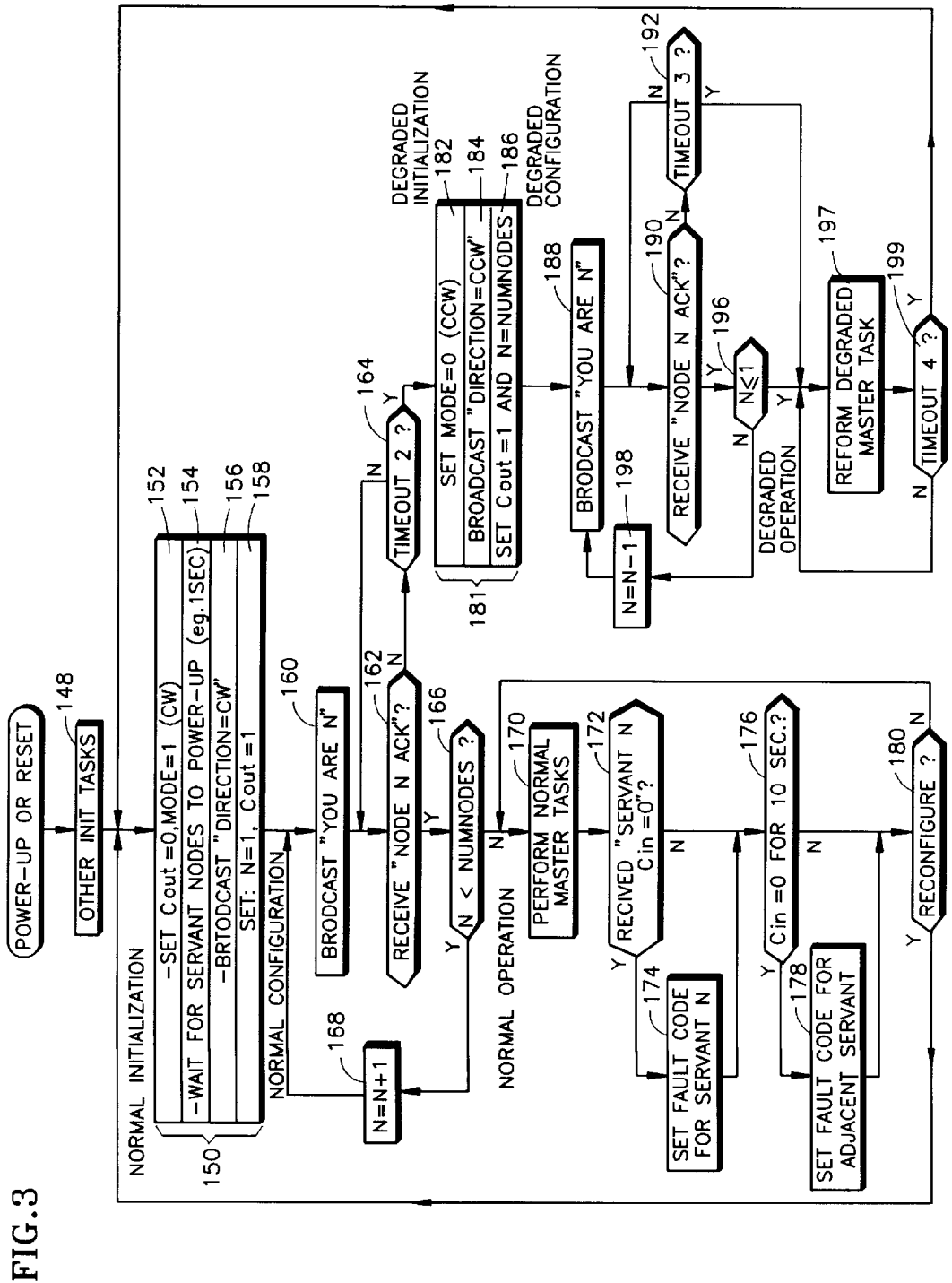
FIG. 3 is a flowchart showing operation of the state machine of FIG. 2 for a master node, in accordance with the present invention.

Referring to FIG. 3, more specifically, the logical operations of the state machine 62 (FIG. 2) for the master node 10 (FIG. 1) is shown. Upon power-up or reset of the master node 10, the master performs whatever initialization tasks it would normally perform in the absence of the present invention, in a step 148 (FIG. 3), and then enters Normal Initialization as indicated by a series of steps 150. A step 152 sets Cout=0 and the mode output to clockwise (logical one). This sets the I/O ports 22,24 of the master 10 to the default condition as input and output ports, respectively, as discussed hereinbefore. Next, the master waits, e.g., 1 second, for the servant nodes to power-up, as indicated by a step 154. Other wait times may be used if desired. Then, the master 10 communicates the default configuration direction of clockwise (CW) to the servant nodes 12–18 by broadcasting a message of "Direction=CW" on the bus 20 (FIG. 1) to all nodes, as indicated by a step 156. Next, a step 158 sets an internal variable (the node address counter) N=1 and sets the configuration enable output signal Cout=1, thereby indicating to the first servant node 12 in the CW chain that it can be configured.

The master then enters Normal Configuration and broadcasts a configuration message "You are N" to all servant nodes on the shared bus 20 (FIG. 1), as indicated by a step 160 (FIG. 3). For the first pass through, N will equal 1 and, thus, the broadcast configuration message would indicate "You are 1" in the step 160 for configuring the first servant node 12. In that case, the first servant 12 is the only servant to be configured based on the bus messages because its Cin=1 and it has not yet been configured (discussed more hereinafter for the servant node logic).

Next, the master 10 waits to receive an acknowledge message ("Node 1 Ack") on the bus 20 from the first servant node 12 indicating that the servant has been configured. If the acknowledge message from that servant node is not received within a time period Timeout 2, as indicated by a step 164, the master 10 enters Degraded Initialization, discussed hereinafter.

If the master 10 receives the acknowledge message within the time period Timeout 2, then a next step 166 determines whether all the servant nodes have been configured, i.e., whether N is less than the total number of servant nodes (NumNodes). If all the servant nodes have not been configured, i.e., N<NumNodes, then a step 168 increments the variable N and the logic repeats the step 160 for the next numbered servant node. The master assigns servant node addresses, one at a time, from the first node 12 to the last node 18 until all servant nodes have been configured. When the variable N reaches the total number of servant nodes in the system (NumNodes), all servant nodes have been configured and the master 10 enters Normal Operation.

When the master 10 enters Normal Operation, all servant nodes have been configured and all the nodes may communicate using the assigned node identifiers. In Normal Operation the master 10 performs whatever functions and communications it would normally perform in the absence of the present invention (Normal Master Tasks), as indicated by a step 170. In addition to the Normal Master Tasks, the master monitors the bus for a "Servant N Cin=0" message indicating that a servant node's Cin signal has gone to zero and stayed zero for at least a predetermined period of time (e.g., 10 seconds), as indicated by a step 172. Other times may be used if desired. If a servant node's Cin signal goes to 0 (Cin=0), there is either a break in or disconnection of one of the daisy-chain connections between nodes, or a power loss condition, failure, or reset of an adjacent node. In that case, the master sets an appropriate fault/information code associated with the node adjacent to the servant node that sent the message, as indicated by a step 174. Which adjacent node is failed will depend on the configuration direction mode of the system at the time the failure is reported to the master.

Also, the master monitors its Cin signal from the last servant node (which is adjacent to the master) for Cin=0, as indicated by a step 176. If Cin=0 for a predetermined time period (e.g., 10 seconds), the master sets an appropriate fault/information code associated with the node adjacent to the servant node that sent the message, as indicated by a step 178. Which adjacent node is failed will depend on the configuration direction mode of the system at the time the failure is reported to the master.

In the event a fault code is set for a node, the Master performs whatever tasks it would normally perform in the event of a failed servant node, including attempting to reconfigure the system, as indicated by a step 180. The decision to reconfigure may be based on numerous factors, such as the number of faults detected, whether the servants having faults are responding properly, the type of other faults that exist in the system, etc., and will be determined by setting a reconfigure flag in the normal master tasks in the step 170, and which is evaluated in the step 180. The logic determining when to reconfigure the system is not important to the present invention.

If a "Node N Ack" message is not received within the time period Timeout 2, as indicated by the step 164, the system enters Degraded Mode, comprising Degraded Initialization, Degraded Configuration, and Degraded Operation. In Degraded mode, the master attempts to configure the servant nodes in the opposite direction to the default direction, i.e., counter-clockwise (CCW) or bottom-up.

First, the master enters Degraded Initialization as indicated by a series of steps 181. In particular, a step 182 sets the mode signal to zero (the CCW direction). This configures the I/O ports 22,24 of the master 10 (FIG. 1) as output and input ports, respectively. Next, the master broadcasts to all servant nodes the message "Direction=CCW" onto the bus 20, as indicated by a step 184. This message commands all servant nodes to set their I/O ports to allow for CCW configuration (i.e., mode=0 for each servant node). Then, the Cout signal from the master is set to 1 and the variable N is set to the total number of servant nodes (or NumNodes) in the system, as indicated by a step 186.

Next, the master enters Degraded Configuration where the master attempts to configure as many servant nodes as possible in the CCW direction by assigning servant node addresses one at a time from the servant node 18 to the servant node 12.

More specifically, in Degraded Configuration, the master broadcasts a configuration message "You are N" on the shared bus 20 as indicated by a step 188 where N is the counter variable as discussed hereinbefore. Next, the master waits to receive a "Node N Ack" message from the node it is attempting to configure, as indicated by a step 190, which indicates that the servant has been configured. If the Node N Ack message is not received after a time Timeout 3, as indicated by a step 192, the master stops the Degraded Configuration process and enters Degraded Operation, discussed hereinafter. If the master receives the "Node N Ack"signal within the time period Timeout 3, a next step 196 determines whether all the servant nodes have been configured, i.e., if N is less than or equal to 1. If all the nodes have not been configured, then a step 198 decrements the variable N by one and the logic repeats the step 188 for the next numbered servant node in the CCW direction.

When all the servant nodes have been configured using Degraded Configuration or if the "Node N Ack" is not received within the time period Timeout 3, the system enters Degraded Operation. In Degraded Operation, the master performs whatever tasks it would perform in the absence of the present invention if certain nodes were known to be failed (Degraded Master Tasks), in a step 197. Also, in Degraded Operation, all servant nodes which were previously configured and did not lose their node address (which could happen during power loss) will operate normally. Since the configuration chain is unreliable in Degraded Operation, the master does not use a break in the configuration enable signal between nodes, i.e., Cin=0, as an indicator to reconfigure the network. However, the master node periodically attempts to restore the network to Normal Operation waiting a predetermined time period Timeout 4, as indicated by a step 199, and then going to Normal Initialization and the step 152.

Figure 4:
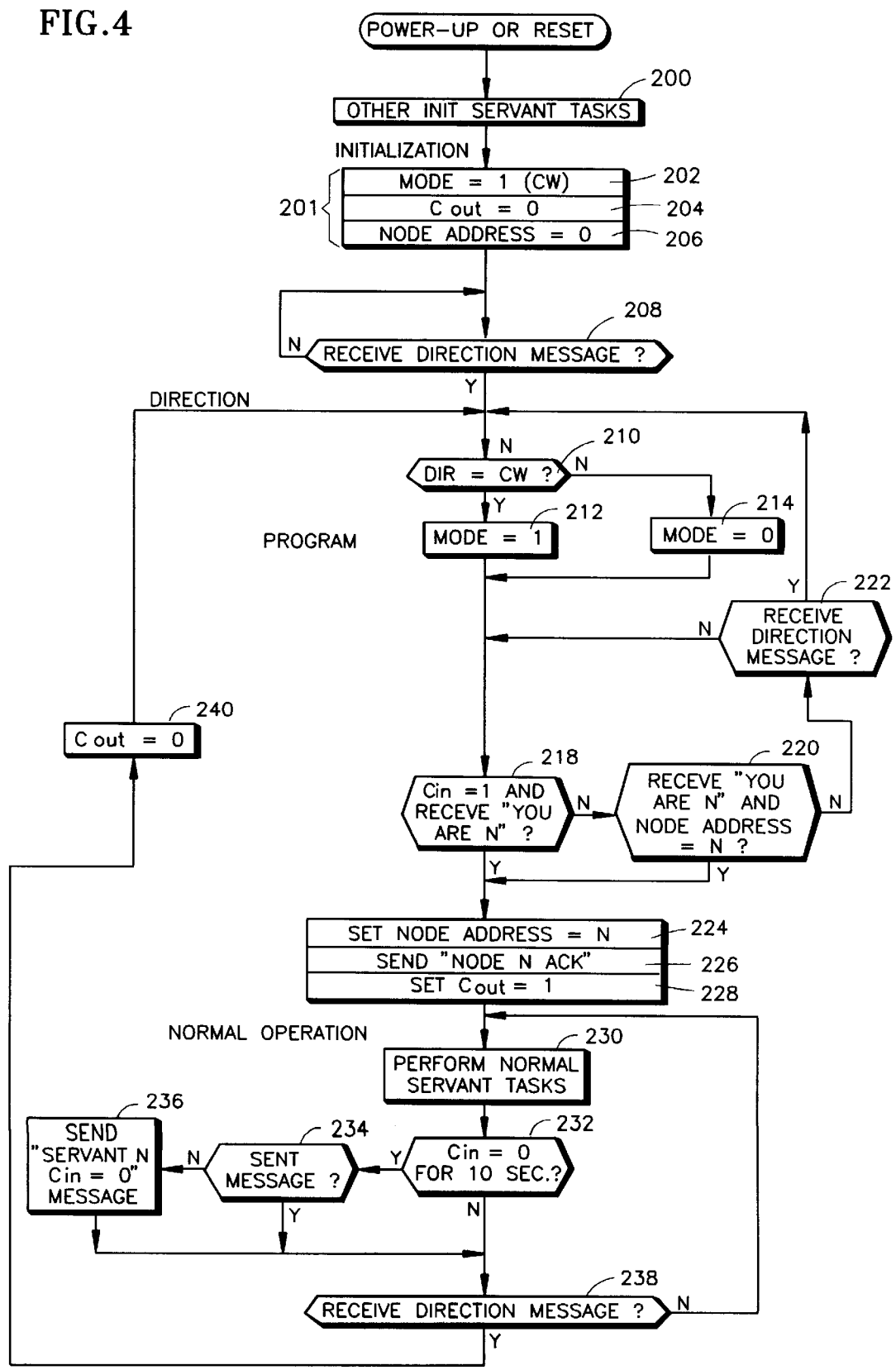
FIG. 4 is a flowchart showing operation of the state machine of FIG. 2 for a servant node, in accordance with the present invention.

Referring now to FIG. 4, the logical operations of the state machine 62 for the servant nodes 12—18 is shown. Upon power-up or reset of a servant node, the servant node performs whatever servant initialization tasks it would normally perform in the absence of the present invention, in a step 200, and then, enters Initialization mode as indicated by a series of steps 201. In the Initialization mode, since the direction of configuration is unknown, a step 202 sets the mode=1 indicating a clockwise (CW) direction, which is the default direction. Next, Cout is set to 0 as indicated by a step 204 to ensure that the adjacent node is not configured out of turn. Next, since the servant node has no present node address, the servant Node Address variable is set to 0 as indicated by a step 206.

Next, the servant waits for a direction message from the master node as indicated by a step 208. When a direction message is received, the servant enters Direction mode and a step 210 checks if the message is clockwise (CW). If it is, a step 212 sets the mode=1, indicating CW. Otherwise, a step 214 sets the mode=0, indicating CCW.

Next, the servant enters Program mode where the servant checks for Cin to equal 1 and to receive a "You are N" message from the master as indicated by a step 218. If the result of the inquiry in the step 218 is no, a step 220 checks if the servant has both received a "You are N" message on the bus and its Node Address is equal to N. If not, a step 222 checks if a Direction Message has been received on the bus. If it has, the logic goes back to the Direction Mode and the step 210. If the result of step 222 is no, the logic repeats the step 218.

If the result of the step 218 is yes, then an adjacent node has been configured (Cin=1) and a configuration message has been received, this servant node is the next node to be configured. If the result of the step 220 is yes, the servant had a previously stored node address which matched the node address sent by the master on the bus, thereby indicating that this servant can configure itself to the previously stored address. Accordingly, if the result of either of the steps 218,220 is yes, then, the servant node sets its node address to N (Node Address=N), as indicated by a step 224, then sends a "Node N Ack" message on the bus 20 to the master in a step 226, sets the output signal Cout=1 in a step 228, and then enters Normal Operation.

In Normal Operation the servant operates normally, freely communicating with other nodes. In particular, the servant node performs whatever functions and communications it would normally perform in the absence of the present invention (Normal Servant Tasks), as indicated by a step 230. In addition to the Normal Servant Tasks, the servant monitors the Cin signal in a step 232 to see if the Cin signal has gone to zero continuously for at least 10 seconds. If so, a step 234 checks to see if it has sent a "Servant N Cin=0" message. If it has not yet sent the message, the servant sends a "Servant N Cin=0" message onto the bus in a step 236. Instead of 10 seconds, other times may be used if desired. As discussed hereinbefore, if a servant node's Cin signal goes to 0 (Cin=0), there is likely a break in or disconnection of one of the daisy-chain connections between nodes, or a power loss condition, failure, or reset of an adjacent node.

If Cin is not equal to 0 for 10 seconds in the step 232 or if it is and the servant has sent the "Servant N Cin=0" message, a step 238 examines whether a Direction message has been received on the bus from the master. If it has, the logic sets Cout=0 at the step 240 to allow for proper configuration of the nodes. Then, the logic jumps to the Direction mode and the step 210, where the servant node sets its internal direction and then enters the Program Mode. If no direction message has been received at the step 238, the step 230 is repeated.

Figure 5:
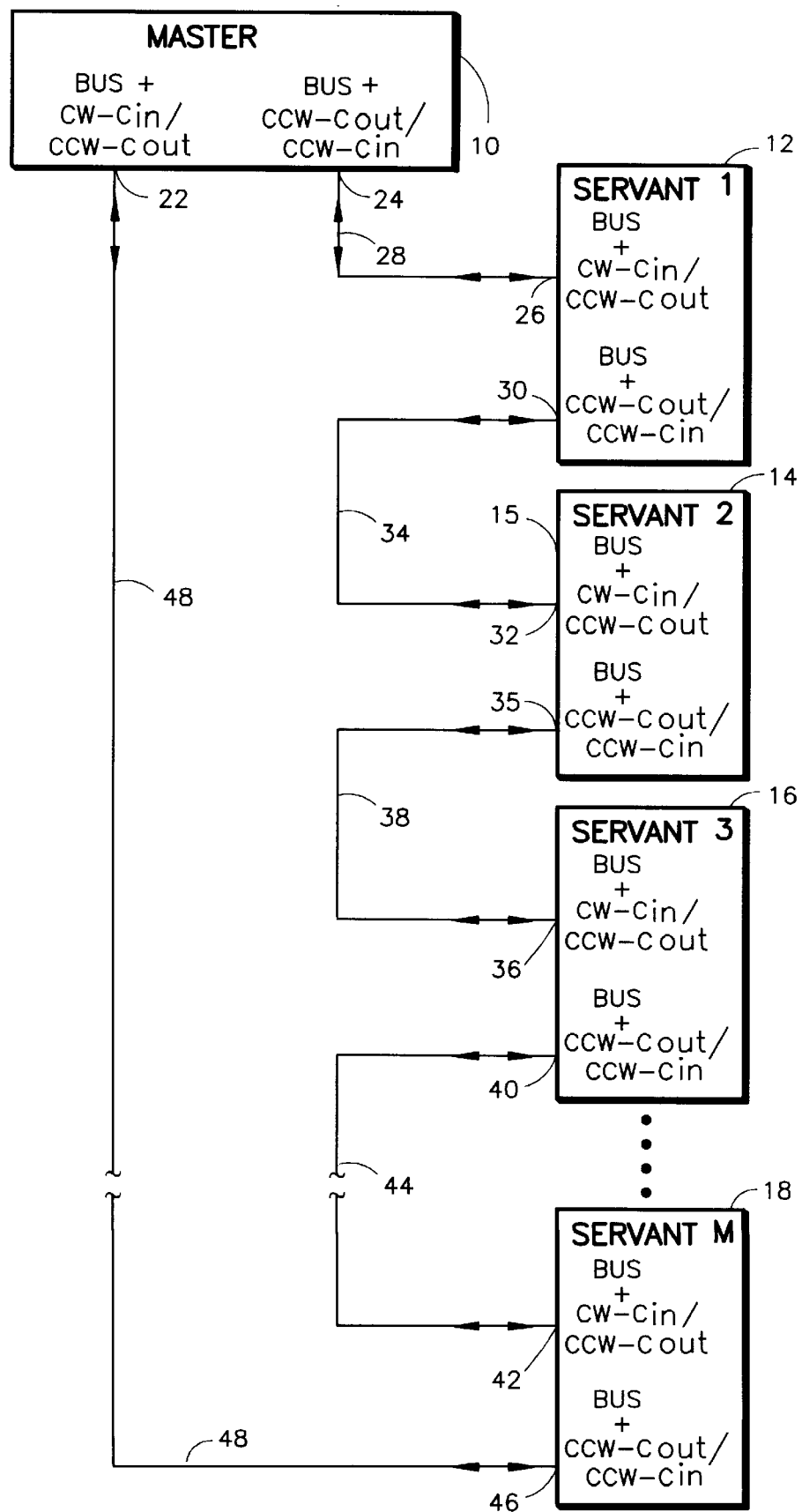
FIG. 5 is a schematic block diagram of a communication network having a combined shared and unshared communication network, in accordance with the present invention.
Figure 6:
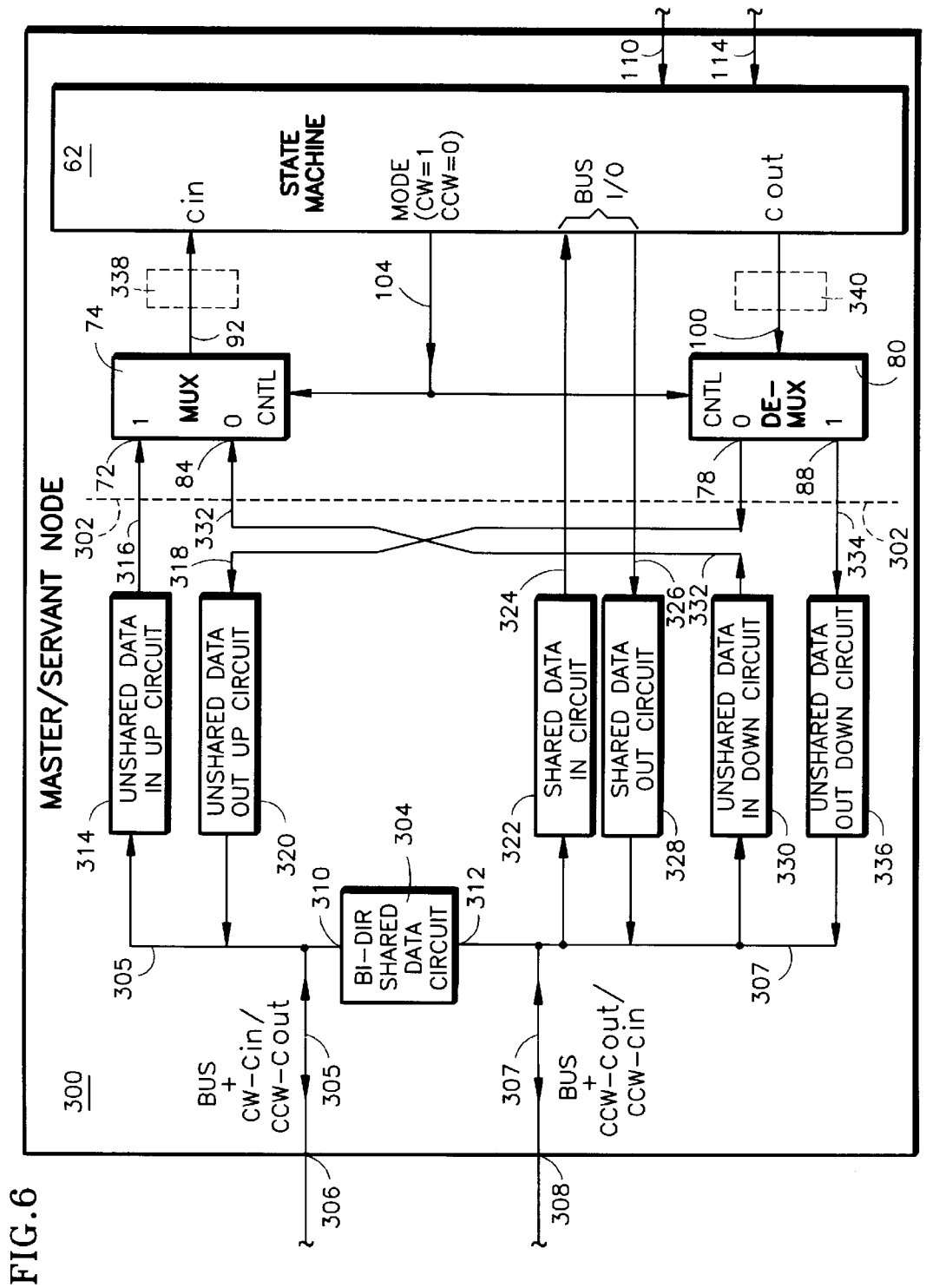
FIG. 6 is a schematic block diagram of a master/servant node for the system of FIG. 5, in accordance with the present invention.

Referring now to FIGS. 5 and 6, instead of using separate shared communication link 20 (FIG. 1) and unshared (daisy-chain) communication link (28,34,38,44,48), the invention may use a single combined (or common) shared/unshared communication link by using a network interface such as that described in copending U.S. patent application Ser. No. (UTC Docket No. R-4035), entitled "Multi-Topology Network Communication Link Interface", filed contemporaneously herewith. In that case, the bus line 20 (FIG. 1) would not exist and the unshared lines 28,34,38,44,48 would carry the Cin and Cout signals as well as the signals previously carried by the bus 20 (FIG. 1). Accordingly, in FIG. 5 the bus ports 13,15,17,19 (FIG. 1) on the servants 12–18 and port 11 on the master 10 have been removed and the CW-Cin/CCW-Cout and CW-Cout/CCW-Cin ports of the master and each servant have been relabeled as "Bus+CW-Cin/CCW-Cout" and "Bus+CW-Cout/CCW-Cin", respectively.

For the combined communication network of FIG. 5, the shared data signals are in a first frequency range, e.g., high frequency, and the unshared (daisy-chained) data signals are in a second frequency range, e.g., lower frequency or dc (as described hereinbefore) from the shared data signals. In that case, the nodes have filters which pass shared data and do not pass unshared data (discussed hereinafter). Also, in that case, the state machine 62 contains the appropriate known interfaces for receiving and transmitting the corresponding frequency data. However, the logic for the state machine 62 of the master and the servant nodes is the same as described hereinbefore in FIGS. 3,4 for the separate shared and unshared communication link.

Referring to FIG. 6, a master/slave node 300 for the combined (or common) shared/unshared communication link of FIG. 5 comprises the same hardware as the generic master/servant node 60 of FIG. 2, shown to the right of a dashed line 302, with additional components shown to the left of the dashed line 302.

In particular, a network communication link interface described in the FIG. 4 of the aforementioned patent application has a Bi-directional Shared Data Circuit 304 (or filter) connected between the lines 305,307, in series with the communication link, having one I/O port 310 connected to the line 305 and another I/O port 312 connected to the line 307. The Bi-directional Circuit 304 receives combined shared and unshared data and passes the shared data and does not pass (or attenuates) the unshared data. The circuit 304 may be uni-directional if desired. In that case, the shared data may only pass along the combined (or common) shared/unshared link in one direction.

The line 305 is also connected to an Unshared Data In Up circuit 314 which provides a Unshared Data In Up signal on a line 316 to the port 72 of the Mux 74. The circuit 314 receives combined shared and unshared data on the line 305 and passes the unshared data and does not pass (or attenuates) the shared data.

An Unshared Data Out Up signal on a line 318 from the port 78 of the De-mux 80 is fed to an Unshared Data Out Up Circuit 320 which couples the Unshared Data Out Up onto the line 305 and thus onto the common shared/unshared link.

The line 307 is also connected to a Shared Data In Circuit 322 which provides a Shared Data In signal on a line 324. The circuit 322 receives combined shared and unshared data and passes the shared data and does not pass (or attenuates) the unshared data. A Shared Data Out signal on a line 326 is fed to a Shared Data Out Circuit 328 which couples the Shared Data Out onto the line 307 and thus onto the common shared/unshared link. The I/O lines 324,326 are equivalent to the bus I/O line 68 discussed hereinbefore with FIG. 2.

The line 307 is also connected to an Unshared Data In Down circuit 330, similar to the Unshared Data In Up Circuit 314 discussed hereinbefore, which provides an Unshared Data In Down signal on a line 332 to the port 84 of the Mux 74. The circuit 330 receives combined shared and unshared data on the line 126 and passes the unshared data and does not pass (or attenuates) the shared data.

An Unshared Data Out Down signal on a line 334 is fed to an Unshared Data Out Down Circuit 336, similar to the Unshared Data Out Up Circuit 320, which couples the Unshared Data Out Down signal onto the line 307 and thus onto the common shared/unshared link.

The circuits 304,314,320,322,328,330,336 are equivalent to the circuits 128,130,134,136,142, 144,148, respectively, of FIG. 4 of the aforementioned patent application. Also, a detailed discussion of the various embodiments of the communication link interface and of the operation and content of the circuits 304,314,320,322,328, 330,336 and of how the data signals are filtered and coupled onto the common shared/unshared link for each embodiment are provided therein. Any other changes, additions, or alternative embodiments discussed in the aforementioned copending patent application may also be applied to the present invention, if desired.

Also, some portion or all of the circuits 314,330 may be consolidated and moved to between the Mux 74 and the State Machine 62 along the line 92, as indicated by a dashed box 338. Similarly some portion or all of the circuits 320,336 may be consolidated and moved to between the De-mux 80 and the State Machine 62 along the line 100, as indicated by a dashed box 340.

Even though the invention has been illustrated as using a mux and de-mux for providing controllable I/O ports, it should be understood by those skilled in the art that any other combination of switches and/or digital logic may be used to provide controllable I/O ports. Also, if desired, the master node need not have the same hardware configuration as the servant nodes.

It should be understood that the number of servant nodes may be increased or decreased, if desired. In that case, the master state machine should be updated to change the constant NumNodes to the current number of nodes in the system.

Although the invention is described with only one master node 10, the invention will also work with more than one master node.

Also, the unique identifier for each node need not be matched to the order in which the node is configured. In particular, instead of broadcasting "You are N" where N is the servant node counter, the master may broadcast "You are 'Name'" where "Name" is a desired unique identifier for that servant node. Thus, it may broadcast whatever unique identifier desired independent of its location in the daisy chain. Also, if desired, the default configuration may be CCW and the degraded configuration direction may be CW.

Further, instead of the bus 20 and daisy chain connections (28,34,38,44,48) being electrical connections, they may be optical connections, such as fiber optic connections. Also, instead of using solely a static dc signal for the unshared configuration enable signals Cin, Cout, the configuration enable signals Cin, Cout may be serial or parallel data streams having a predetermined protocol between servants and the appropriate number of wires. In that case, the hardware/firmware in the state machine would provide the appropriate known input interface decoding for the Cin signal and the appropriate known output signal interface and/or drivers for the Cout signal.

Even though the invention has been described as having controllable I/O ports to allow configuration in the CW and CCW directions, it should be understood that single direction (CW or CCW) configuration may be employed if desired. In that case, one port of each node would be designated as an input port for receiving the input configuration enable signal Cin and another port would be designated as an output port for providing the output configuration enable signal Cout. Also, in that case, the master logic of FIG. 3 would not have Degraded Initialization nor Degraded Configuration because reverse direction configuration is not employed, but would enter Degraded Operation only.

Also, in that case, instead of sending a direction message, the master could send a "configuration start" message. Similarly, the effect for the servant nodes would be that the steps 210,212,214,222 need not be performed, the "no" branch of the step 220 would be fed to the step 218, and the steps 208 and 238 would test whether a "configuration start" message has been received on the bus. Other logic simplifications may be made for the servant and master nodes, if desired.

Furthermore, it is not required for an acknowledge message ("node N Ack") to be sent by the servant to the master. This is the case whether or not bi-directional configuration is employed. Instead, the master may proceed to configure servants one at a time with a predetermined pause between each configuration message. In that case, the master need not perform the steps 162,164 (FIG. 3), and instead may perform a pause in place thereof for enough time for the servant to be configured and to set its Cout signal high. In that case, the master would not enter Degraded mode during the configuration process.

It should be understood that the flow charts of FIGS. 3 and 4 illustrate one way to perform the servant and master logic to implement the present invention and that other logic flows and steps may be used to perform the functions described herein.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A communication network, comprising:
   a plurality of servant nodes each receiving configuration enable signals, each receivingconfiguration messages, each being configured with a unique identifier corresponding to each of said servant nodes in response to a corresponding one of said configuration enable signals and a corresponding one of said configuration messages, and each providing a configuration enable signal when a corresponding one of said servant nodes is configured;
   a master node which provides said configuration messages to all of said servant nodes, each of said messages being indicative of said unique identifier for a corresponding one of said servant nodes being configured, and which provides said configuration enable signal to a first one of said servant nodes when said first servant node is being configured;
   said master node and all of said servant nodes being connected to each other by a communication link which passes shared data between said master node and all of said servant nodes and passes unshared data between predetermined groups of said master and servant nodes;
   said configuration messages being provided on said communication link as said shared data and said configuration enable signals being provided on said communication link as said unshared data; and
   each of said servant nodes being configured with said unique identifier based on a corresponding one of said configuration messages from said master node when said corresponding configuration message is received and when a corresponding one of said enable signals is received.

2. The communication network of claim 1 wherein said communication link comprises separate shared and unshared communication links, said shared link propagating said shared data and said unshared link propagating said unshared data.

3. The communication network of claim 1 wherein said communication link comprises a common shared/unshared communication link which propagates both said shared data and said unshared data.

4. The communication network of claim 3 wherein:
   each of said servant nodes comprises:
      a first circuit disposed along said common communication link which passes said shared data and does not pass said unshared data; and
      a second circuit connected to said common communication link which passes said unshared data and does not pass said shared data.

5. The communication network of claim 4 wherein said shared data has a frequency which is higher than that of said unshared data.

6. The communication network of claim 1 wherein said master node configures said plurality of servant nodes in a different order when one of said servant nodes has not configured in response to said configuration messages and said configuration enable signals.

7. The communication network of claim 1 wherein each of said servant nodes provides an acknowledge message to said master node when a corresponding one of said servant nodes is configured.

8. The communication network of claim 1 wherein each of said servant nodes comprises identical hardware and software for configuring said nodes.

9. The communication network of claim 1 wherein
   said master node comprises two master I/O ports, said master I/O ports being controllable in response to a mode signal, such that when one of said master I/O ports is oriented as an input port, the other of said master I/O ports is oriented as an output port;
   each of said servant nodes comprises two servant I/O ports, said servant I/O ports being controllable in response to a mode signal, such that when one of said servant I/O ports is oriented as an input port the other of said servant I/O ports is oriented as an output port; and
   each of said servant and master I/O ports providing said configuration enable signals when oriented as an output port and receiving said configuration enable signals when oriented as an input port.

10. The communication network of claim 1 wherein:
    each of said servant nodes comprises servant signal processing logic which receives said configuration messages and said configuration enable signals for assigning said unique identifier to said servant nodes in response to said configuration messages and said configuration enable signals, and which provides said configuration enable signal indicating that a corresponding one of said servant nodes is configured; and
    said master node comprising master signal processing logic which provides said configuration messages and said direction messages to all of said servant nodes.

11. A method for configuring a communication network, comprising:
    connecting a master node and a plurality of servant nodes with a communication link which passes shared data between said master node and all of said servant nodes and which passes unshared data between predetermined groups of said master and servant nodes;
    receiving configuration enable signals and configuration messages at each of said servant nodes;

configuring each of said servant nodes with a unique identifier corresponding to each of said servant nodes in response to a corresponding one of said configuration enable signals and a corresponding one of said configuration messages, and providing a configuration enable signal from each of said servant nodes when a corresponding one of said servant nodes is configured;

providing said configuration messages from said master node to all of said servant nodes, each of said configuration messages being indicative of a unique identifier for a corresponding one of said servant nodes being configured, and providing said configuration enable signal from said master node to a first one of said servant nodes when said first servant node is being configured;

providing said configuration messages on said communication link as said shared data and providing said configuration enable signals on said communication link as said unshared data; and configuring each of said servant nodes with said unique identifier based on a corresponding one of said configuration messages from said master node when said corresponding configuration message is received and when a corresponding one of said enable signals is received.

12. The method of claim 11 wherein said communication link comprises separate shared and unshared communication links said shared link propagating said shared data and said unshared link propagating said unshared data.

13. The method of claim 11 wherein said communication link comprises a common shared/unshared communication link which propagates both said shared data and said unshared data.

14. The method of claim 13 wherein said step of receiving said configuration enable signals and configuration messages by each of said servant nodes comprises passing said shared data along said common link and not passing said unshared data along said common link.

15. The method of claim 14 wherein said shared data has a frequency which is higher than that of said unshared data.

16. The method of claim 11 wherein said master node configures said plurality of servant nodes in a different order when one of said servant nodes has not configured in response to said configuration messages and said configuration enable signals.

17. The method of claim 11 further comprising the step of providing an acknowledge message from each of said servant nodes to said master node when said servant node has been configured.

18. The method of claim 11 wherein each of said servant nodes comprises identical hardware and software for configuring said nodes.

* * * * *